(12) United States Patent
Sung et al.

(10) Patent No.: US 8,758,913 B2
(45) Date of Patent: Jun. 24, 2014

(54) MEMBRANELESS MICRO FUEL CELL

(75) Inventors: Hyung Jin Sung, Daejeon (KR); Sang Youl Yoon, Busan (KR); Dewan Hasan Ahmed, Daejeon (KR); Hong Beom Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1625 days.

(21) Appl. No.: 11/902,421

(22) Filed: Sep. 21, 2007

(65) Prior Publication Data

US 2009/0042083 A1 Feb. 12, 2009

(30) Foreign Application Priority Data

Aug. 9, 2007 (KR) .................. 10-2007-0080270

(51) Int. Cl.
*H01M 2/00* (2006.01)
*H01M 2/18* (2006.01)
*H01M 8/00* (2006.01)
*H01M 8/02* (2006.01)

(52) U.S. Cl.
USPC ........................................... 429/34; 429/401

(58) Field of Classification Search
USPC .......................................................... 429/401
IPC ............ H01M 8/002,8/0258, 8/0265, 8/04186, H01M 8/04201, 8/2455, 4/8626, 4/8636; Y02E 60/50
See application file for complete search history.

(56) References Cited

U.S. PATENT DOCUMENTS

| | | | |
|---|---|---|---|
| 7,901,817 B2* | 3/2011 | Markoski et al. ............. | 429/414 |
| 2003/0134163 A1* | 7/2003 | Markoski et al. ............... | 429/13 |
| 2005/0084737 A1* | 4/2005 | Wine et al. ...................... | 429/38 |
| 2006/0003217 A1* | 1/2006 | Cohen et al. .................... | 429/34 |
| 2006/0210867 A1* | 9/2006 | Kenis et al. ................... | 429/101 |

* cited by examiner

*Primary Examiner* — Alix Echelmeyer
(74) *Attorney, Agent, or Firm* — Nath, Goldberg & Meyer; Jerald L. Meyer; Stanley N. Protigal

(57) ABSTRACT

Disclosed herein is a membraneless micro fuel cell. A cathode fluid and an anode fluid with a low Reynolds number flowing along a cathode channel and an anode channel are formed to have an interface with each other through a micro passageway and to be mixed by only diffusion so that the direct mixing of the cathode fluid and the anode fluid is prevented, making it possible to prevent reactants from being depleted at an electrode surface as well as to increase the efficiency of the fuel cell.

48 Claims, 13 Drawing Sheets

MEMBRANELESS MICRO FUEL CELL

BACKGROUND OF THE INVENTION

This application claims priority to Korean Patent Application No. 2007-0080270, filed on Aug. 9, 2007, in the Korean Intellectual Property Office, the entire contents of which are hereby incorporated by reference.

FIELD OF THE INVENTION

The present invention relates to a fuel cell, and more specifically to a membraneless micro fuel cell.

DESCRIPTION OF THE RELATED ART

As noted, as the standard of living is improved and the use of portable electronic devices is spread in daily life, the demand for the portable electronic devices is gradually increasing.

There are a lot of different kinds of the portable electronic devices such as, for example, a cellular phone, a notebook computer, a laptop computer, a global positioning system (GPS), a camera, a video camera, portable medical equipment, and portable equipment for military, etc.

As the major concerns for the portable electronic devices, there are devices size, weight, and an energy source for operating these devices. As the energy source for the portable devices, a rechargeable Lithium-ion (hereinafter refer to as "Li-ion") battery has been mainly used up to now.

However, since the Li-ion battery cannot satisfy the user requirements for the portable electronic device, an environment-friendly fuel cell as an alternative to the Li-ion battery has been spotlighted. Furthermore, it is expected that a micro fuel cell market for the portable electronic device will hold great potential in future.

A proton exchange membrane fuel cell (PEMFC) or a direct methanol fuel cell (DMFC) is considered as potential candidates for portable micro fuel cells.

However, the PEMFC and the DMFC have several problems associated with their operation, such as water management, carbon monoxide poisoning, etc. Other problems raises when a fuel cell needs to miniaturize for portable electronic devices such as pumping system for the reactants to the fuel cell, water removal process, sealing issue, and reactants crossover in the fuel cell, etc.

Furthermore, both the PEMFC and the DMFC need a membrane. The membrane is considered a heart of the fuel cell, that is, a core technology of the fuel cell and occupies approximately 15% of the total cost of the fuel cell. In addition, the cost of a membrane electrode assembly (MEA) occupies approximately 50% of the total cost of the fuel cell.

Due to the use of the membrane as above, the cost of the fuel cell is increased, and the size of the fuel cell is restricted so that it is difficult to miniaturize the fuel cell, and the manufacturing process of the fuel cell is increased so that its productivity is lowered.

SUMMARY OF THE INVENTION

In order to solve the problems, an object of the present invention is to provide a membraneless fuel cell capable of reducing the cost of the fuel cell as well as miniaturizing the fuel cell to be applied to a portable electronic device, by removing a membrane.

In order to attain the above objects, there is provided a membraneless micro fuel cell having a plurality of unit cells according to one aspect of the present invention, the unit cell comprising: a cathode channel partitioned to allow a cathode fluid to flow therein; an anode channel partitioned to allow an anode fluid to flow therein; and a passageway connecting the cathode channel and the anode channel and allowing the cathode fluid and the anode fluid to form an interface with each other and to be mixed by diffusion.

Here, the cathode channel and the anode channel may have the same or different cross sectional areas.

The cross sectional areas of the cathode channel and the anode channel may be constant along the longitudinal direction of the unit cell.

In addition, the cross sectional areas of the cathode channel and the anode channel may be different along the longitudinal direction of the unit cell. At this time, the cross sectional areas of the cathode channel and the anode channel may be reduced or enlarged as they proceed from the inlet side end to the outlet side end of the unit cell.

The cathode channel and the anode channel may have any one cross section shape of a circular shape, an oval shape, and a polygonal shape.

The cathode channel and the anode channel may have the same or different cross section shape.

Preferably, at least a portion of wall surfaces partitioning the cathode channel forms the cathode electrode, and at least a portion of wall surfaces partitioning the anode channel forms the anode electrode.

At this time, the cathode electrode and the anode electrode may form the wall surfaces of the cathode channel and the anode channel that face each other with the passageway as the center.

The cathode electrode and the anode electrode may have surface roughness in the inside of the unit cell. Here, the cathode electrode and the anode electrode may have predetermined pattern shapes, and the pattern shapes may be formed in parallel with each other along the longitudinal direction of the unit cell.

Preferably, the cathode fluid and the anode fluid flow with a Reynolds number in the range of 100 to 0.01, and the cathode fluid and the anode fluid flow in the same direction or in an opposite direction to each other.

The unit cells may be arranged in parallel with each other in a horizontal direction. The cathode channel and the anode channel may be arranged up and down, with the passageway therebetween.

In addition, the cathode channel and the anode channel may be arranged left and right, with the passageway therebetween. At this time, the height of the passageway may be formed to be smaller than that of the cathode channel or the anode channel.

The width of the passageway between the cathode channel and the anode channel may be formed to be smaller than that of the cathode channel or the anode channel. Further, the passageway may be formed of a hole penetrating through a side wall surface shared by the cathode channel and the anode channel.

In addition, the width of the passageway between the cathode channel and the anode channel may be formed to be larger than that of the cathode channel or the anode channel.

In addition, the unit cells may be vertically or obliquely arranged, and arranged in parallel with each other.

The cross sectional area of the passageway may be formed to be constant along the longitudinal direction of the unit cell.

In addition, the cross sectional area of the passageway may be formed to be different along the longitudinal direction of the unit cell. At this time, the cross sectional area of the passageway may be reduced or enlarged as it proceeds from the inlet side end to the outlet side end of the unit cell.

The passageway may continuously or discontinuously connect the cathode channel and the anode channel along the longitudinal direction of the unit cell.

There is provided a membraneless micro fuel cell having a plurality of unit cells according to another aspect of the present invention, the unit cell comprising: a cathode channel partitioned to allow a cathode fluid to flow therein; an anode channel partitioned to allow an anode fluid to flow therein; a proton conductive fluid channel connected to the cathode channel and the anode channel and partitioned to allow a proton conductive fluid to flow therein; a first passageway connecting the cathode channel and the proton conductive fluid channel and allowing the cathode fluid and the proton conductive fluid to form an interface with each other and to be mixed by diffusion; and a second passageway connecting the anode channel and the proton conductive fluid channel and allowing the anode fluid and the proton conductive fluid to form an interface with each other and to be mixed by diffusion.

Here, at least two of the cathode channel, the anode channel, and the proton conductive fluid channel may have the same cross sectional area, in particular, the cathode channel and the anode channel may have the same cross sectional area.

In addition, the cathode channel, the anode channel, and the proton conductive fluid channel may have different cross sectional areas.

The cross sectional areas of the cathode channel, the anode channel, and the proton conductive fluid channel may be constant along the longitudinal direction of the unit cell.

In addition, the cross sectional areas of the cathode channel, the anode channel, and the proton conductive fluid channel may be different along the longitudinal direction of the unit cell, and the cross sectional areas of the cathode channel, the anode channel, and the proton conductive fluid channel may be reduced or enlarged as they proceed from the inlet side end to the outlet side end of the unit cell.

The cathode channel, the anode channel, and the proton conductive fluid channel may have any one cross section shape of a circular shape, an oval shape, and a polygonal shape.

At least two of the cathode channel, the anode channel, and the proton conductive fluid channel may have the same cross section shape, in particular, the cathode channel and the anode channel may have the same cross section shape.

In addition, the cathode channel, the anode channel, and the proton conductive fluid channel may have different cross section shapes.

Preferably, at least a portion of wall surfaces partitioning the cathode channel forms the cathode electrode, and at least a portion of wall surfaces partitioning the anode channel forms the anode electrode.

Preferably, the cathode electrode further comprises a first passageway adjacent the cathode channel and at least a portion of wall surfaces partitioning the proton conductive fluid channel, and the anode electrode further comprises a second passageway adjacent the anode channel and at least a portion of wall surfaces partitioning the proton conductive fluid channel.

At this time, the cathode electrode and the anode electrode may form the wall surfaces of the cathode channel and the anode channel that face each other based on the central part of the proton conductive fluid channel.

The cathode electrode and the anode electrode may have surface roughness in the inside of the unit cell. At this time, the cathode electrode and the anode electrode may have predetermined pattern shapes, and the pattern shapes may be formed in parallel with each other along the longitudinal direction of the unit cell.

Preferably, the cathode fluid, the anode fluid, and the proton conductive fluid flow with a Reynolds number in the range of 100 to 0.01.

Here, all of the cathode fluid, the anode fluid, and the proton conductive fluid may flow in the same direction.

In addition, at least one of the cathode fluid, the anode fluid, and the proton conductive fluid may flow in an opposite direction to each other. At this time, the cathode fluid and the anode fluid may flow in an opposite direction to each other.

The unit cells may be arranged in parallel with each other in a horizontal direction. The cathode channel and the anode channel may be arranged left and right, with the proton conductive fluid channel therebetween, and the cathode channel and the anode channel may be arranged up and down, with the proton conductive fluid channel therebetween. At this time, the width of the first passageway and the second passageway may be formed to be smaller than that of the cathode channel, the anode channel, or the proton conductive fluid channel.

The height of the first passageway between the cathode channel and the proton conductive fluid channel may be formed to be smaller than that of the cathode channel or the proton conductive fluid channel. Further, the first passageway may be formed of a hole penetrating through a side wall surface shared by the cathode channel and the proton conductive fluid channel.

In addition, the height of the first passageway between the cathode channel and the proton conductive fluid channel may be formed to be larger than that of the cathode channel or the proton conductive fluid channel.

The height of the second passageway between the anode channel and the proton conductive fluid channel may be formed to be smaller than that of the anode channel or the proton conductive fluid channel. Further, the second passageway may be formed of a hole penetrating through a side wall surface shared by the anode channel and the proton conductive fluid channel.

In addition, the height of the second passageway between the anode channel and the proton conductive fluid channel may be formed to be larger than that of the anode channel or the proton conductive fluid channel.

In addition, the unit cells may be vertically or obliquely arranged, and arranged in parallel with each other.

The cross sectional areas of the first passageway and the second passageway may be constant along the longitudinal direction of the unit cell.

Further, the cross sectional areas of the first passageway and the second passageway may be different along the longitudinal direction of the unit cell, and the cross sectional areas of the first passageway and the second passageway may be reduced or enlarged as they proceed from the inlet side end to the outlet side end of the unit cell.

The first passageway and the second passageway may continuously or discontinuously connect each of the cathode channel and the anode channel to the proton fluid channel along the longitudinal direction of the unit cell.

The membraneless micro fuel cell according to one aspect of the present invention allows the cathode fluid and the anode fluid with a low Reynolds number, which flows along the cathode channel and the anode channel, to form an interface with each other through the micro passageway and to be mixed by only diffusion so that the direct mixing of the cathode fluid and the anode fluid is prevented, making it possible to prevent reactants from being depleted at an electrode surface as well as to increase the efficiency of the fuel cell.

Furthermore, the membraneless micro fuel cell according to another aspect of the present invention interposes a proton conductive fluid channel between the cathode channel and the anode channel to separate them and allows the cathode fluid and the proton conductive fluid to form an interface with each other through the first passageway as well as the anode fluid and the proton conductive fluid to form an interface with each other through the second passageway and to be mixed by only diffusion so that the direct mixing of the cathode fluid and the anode fluid is more effectively prevented, making it possible to increase the efficiency of the fuel cell.

BRIEF DESCRIPTION OF THE DRAWINGS

These and other objects, features, aspects, and advantages of preferred embodiments of the present invention will be more fully described in the following detailed description, taken in conjunction with the accompanying drawings. In the drawings.

DETAILED DESCRIPTION OF THE INVENTION

Figure 1:
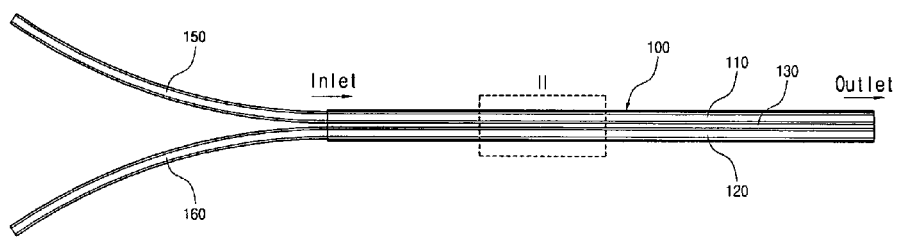
FIG. 1 is a plan view showing a unit cell of a membraneless fuel cell according to a first embodiment of the present invention.

Hereinafter, embodiment of the present invention will be described in detail with reference to the attached drawings. However, the embodiments are intended to illustrate the invention and do not limit the scope of the present invention. When referring to the drawings the same reference numerals are used throughout the different drawings to designate the same or similar components in the following description of the present invention.

FIG. 1 is a plan view showing a unit cell of a membraneless fuel cell according to a first embodiment of the present invention.

As shown in FIG. 1, the membraneless fuel cell of the present embodiment comprises a plurality of unit cells 100.

In the present embodiment, it is illustrated that the plurality of respective unit cells 100 are horizontally arranged in relation to each other. However, the present invention is not limited thereto, but can be applied to the respective unit cells 100 vertically arranged or obliquely arranged to have a slope.

The inlet side ends of the unit cells 100 are connected to a cathode fluid supplying line 150 and an anode fluid supplying line 160, respectively, for supplying a cathode fluid and an anode fluid.

The cathode fluid supplying line 150 connects a tank storing the cathode fluid to a cathode chamber 110 partitioned in the unit cell 100. And, the anode fluid supplying line 160 connects a tank storing the anode fluid to an anode chamber 120 partitioned in the unit cell 100.

Therefore, the cathode fluid and the anode fluid are supplied to the cathode channel 110 and the anode channel 120 of the unit cell 100 through the cathode fluid supplying line 150 and the anode fluid supplying line 160, respectively.

Here, it is illustrated that the cathode fluid supplying line 150 and the anode fluid supplying line 160 are connected in a 'Y' shape according to the horizontal arrangement of the respective unit cells 100.

However, the present invention is not limited thereto. When the respective unit cells 100 are vertically or obliquely formed, the cathode fluid supplying line 150 and the anode fluid supplying line 160 can be connected in a 'T' shape. Furthermore, in addition to the connection in the 'Y' or the 'T' shape according to the arrangement direction of the unit cell 100, they can be connected in more various shapes.

Also, in the present embodiment the constitution is illustrated wherein both the cathode fluid and the anode fluid have an inlet and an outlet of the same direction and flow in the same direction in the inside of the cathode channel 110 and the anode channel 120 of the unit cell 100.

However, the present invention is not limited thereto, but can also include the constitution that the cathode fluid and the anode fluid have the inlet and the outlet of different directions and flow in different directions in the inside of the cathode channel and the anode channel of the unit cell.

Figure 2:
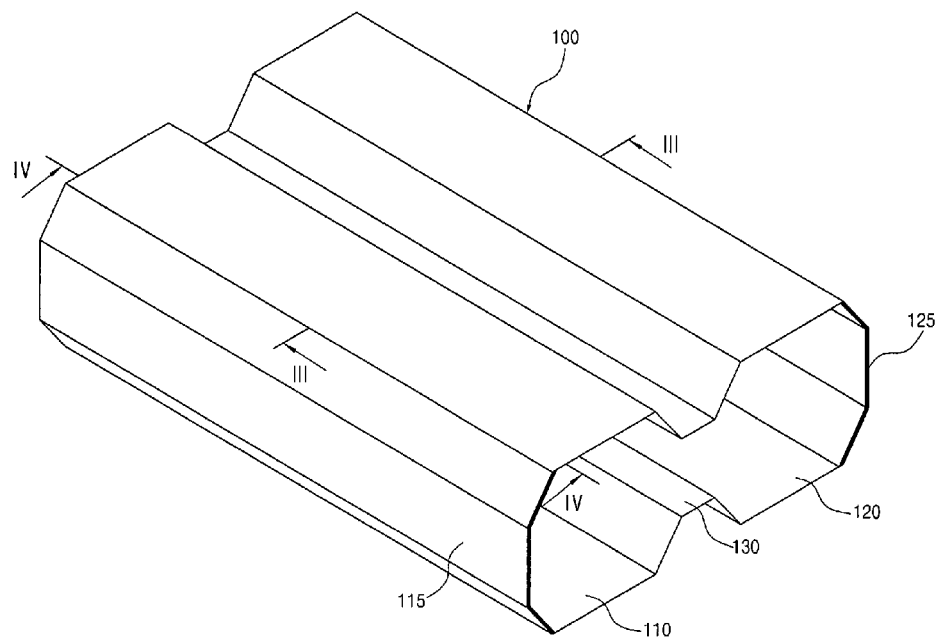
FIG. 2 is an enlarged cutaway perspective view showing part II of FIG. 1.

FIG. 2 is an enlarged cutaway perspective view showing part II of FIG. 1.

Referring to FIG. 2, the unit cell 100 is partitioned into the cathode channel 110 in which the cathode fluid flows, the anode channel 120 in which the anode fluid flows, and a micro passageway 130 connecting the cathode channel 110 and the anode channel 120.

Here, it is illustrated that the cathode channel 110 and the anode channel 120 in the unit cell 100 are partitioned to be arranged left and right, with the passageway therebetween.

However, the present invention is not limited thereto, but can also include the constitution that the cathode channel 110 and the anode channel 120 in the unit cell 100 are partitioned to be arranged up and down, with the passageway 130 therebetween.

Each of the cathode fluid and the anode fluid with a very low Reynolds number in the range of 100 to 0.01 is constituted to flow in the form of laminar flow in the inside of the cathode channel 110 and the anode channel 120 respectively.

As above, as the cathode fluid and the anode fluid with a very low Reynolds number in the range of 100 to 0.01 are constituted to flow, such that they form an interface along the longitudinal direction of the unit cell 100 in the inside of the passageway 130 connecting the cathode channel 110 and the anode channel 120.

Here, if the Reynolds number of the cathode fluid and the anode fluid is 100 or more, the direct mixing of the cathode fluid and the anode fluid may occur so that the reactants can be depleted at an electrode surface, if the Reynolds number of the cathode fluid and the anode fluid is 0.01 or less, the efficiency of the fuel cell is degraded.

Therefore, the mixing of the cathode fluid and the anode fluid should occur only diffusion based on the interface formed in the inside of the passageway 130.

Figure 3:
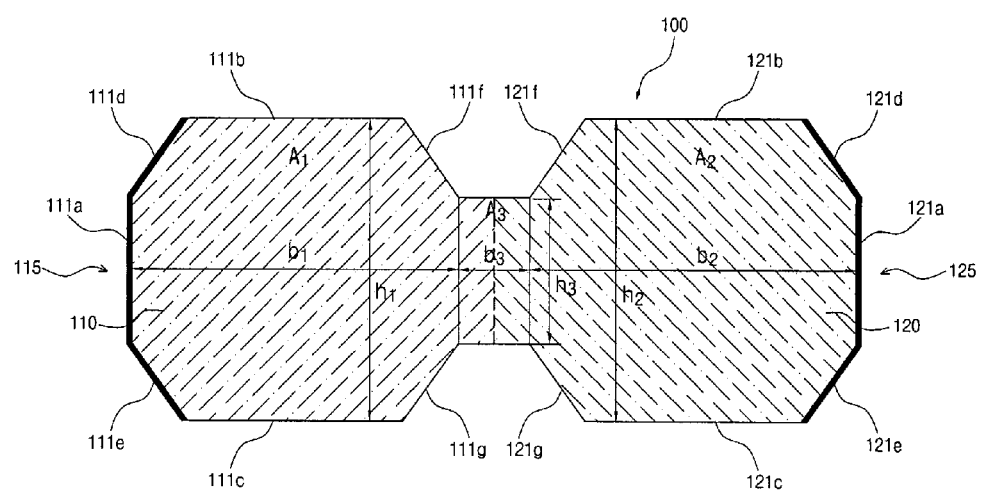
FIG. 3 is a cross-sectional view taken along line III-III of FIG. 2.

FIG. 3 is a cross-sectional view taken along line III-III of FIG. 2.

Referring to FIG. 3, in the unit cell 100 of the present embodiment, all the cathode channel 110, the anode channel 120, and the passageway 130 are partitioned to have a substantially quadrangular cross section shape.

In particular, it is illustrated that each edge of the cathode channel 110 and the anode channel 120 is chamfered to have an octagonal cross section shape and the cathode channel 110 and the anode channel 120 are partitioned to have the same cross sectional area.

However, the present invention is not limited thereto, but the cross section shape of the cathode channel 110 and the anode channel 120 can take any one of a circular shape, an oval shape, and a polygonal shape. Furthermore, the present invention can include the constitution that each of the cathode channel and the anode channel are formed to have different cross section shapes and different cross sectional areas from each other.

Preferably, the passageway 130 is constituted to have smaller height and cross sectional area (h3<h1, h3<h2; A3<A1, A3<A2) than those of the cathode channel 110 or the anode channel 120.

Of course, the cross section shape of the passageway 130 can take any one of a circular shape, an oval shape, and a polygonal shape.

Also, it is illustrated that the width of the passageway 130 is formed to be much smaller (b3<b1, b3<b2) than that of the cathode channel 110 or the anode channel 120. At this time, the passageway 130 can be formed in the shape of a microhole (not shown) penetrating through one side wall surface (not shown) shared by the cathode channel 110 and the anode channel 120.

However, the present invention is not limited thereto, but the width of the passageway 130 is formed to be longer (b3>b1 or b3>b2) than that of the cathode channel 110 or the anode channel 120 so that the direct mixing of the anode fluid and the cathode fluid can be prevented.

Figure 4:
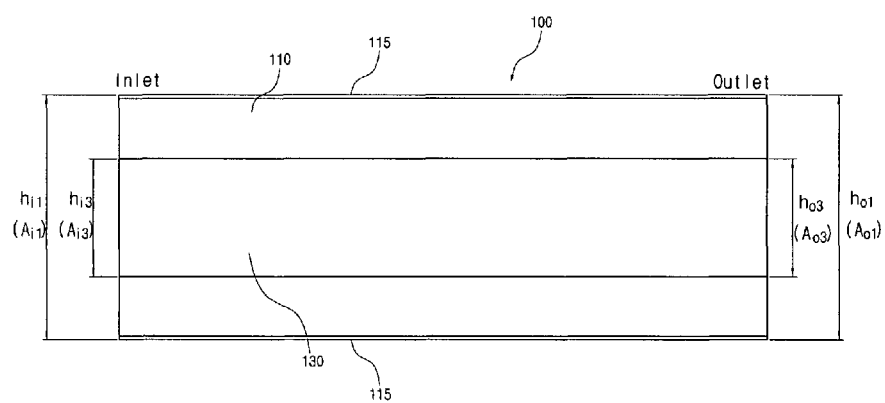
FIG. 4 is a sectional side view taken along line IV-IV of FIG. 2.

FIG. 4 is a sectional side view taken along line IV-IV of FIG. 2.

Referring to FIG. 4, there is shown the cathode channel 110 formed to have the same height (hi1=ho1) and cross section area (Ai1=Ao1) at inlet and outlet side ends along the longitudinal direction of the unit cell 100 in the present embodiment.

In the present embodiment, it is illustrated that the cathode channel 110 and the anode channel 120 are formed to have the same cross section shape and same cross sectional area. Therefore, the description of the cathode channel 110 can replace the description of the anode channel 120.

The anode channel 120 has the same cross sectional area (Ai2=Ao2) and same height (hi2=ho2) from the inlet side end to the outlet side end of the unit cell 100.

However, the present invention is not limited thereto, but can include the constitution that the cathode channel 110 and the anode channel 120 is formed to have different cross sectional areas along the longitudinal direction of the unit cell 100.

Here, the cross sectional areas of the cathode channel 110 and the anode channel 120 are gradually reduced (hi1>ho1, hi2>ho2) or gradually enlarged (hi1<ho1, hi2<ho2) as they proceed from the inlet side end to the outlet side end of the unit cell 100.

In the present embodiment, it is illustrated that the passageway 130 is formed to have a constant height (hi3=ho3) and cross sectional area (Ai3=Ao3) at inlet and outlet side ends along the longitudinal direction of the unit cell 100.

However, the present invention can include the constitution that the passageway 130 is formed to have different cross sectional areas (Ai3≠Ao3). At this time, the cross sectional area of the passageway 130 is gradually reduced (Ai3>Ao3) or gradually enlarged (Ai3<Ao3) as it proceeds from the inlet side end to the output side end.

Also, in the present embodiment it is illustrated that the passageway 130 is constituted to continuously connect the cathode channel 110 and the anode channel 120 along the longitudinal direction of the unit cell 100.

However, the present invention can include the constitution that the passageway 130 discontinuously connects the cathode channel 110 and the anode channel 120.

Figure 5:
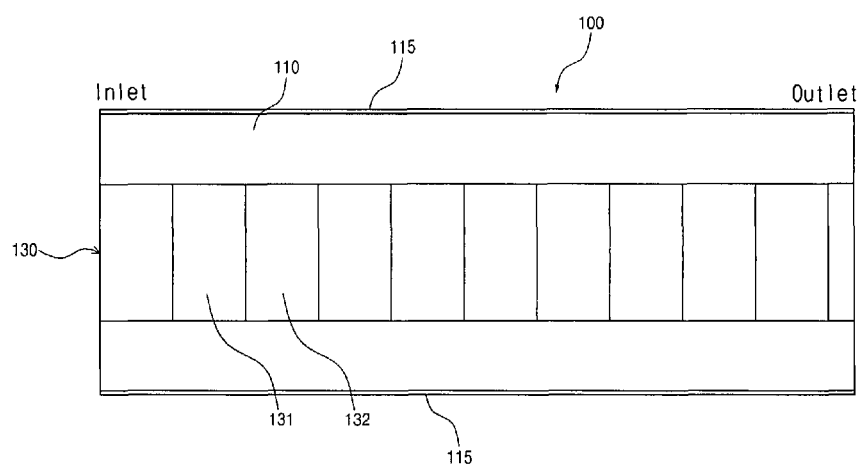
FIG. 5 is a view showing a modification example of a passageway of FIG. 4.

FIG. 5 is a view showing a modification example of the passageway of FIG. 4.

As shown in FIG. 5, the passageway 130 can be formed to discontinuously connect or separate the cathode channel 110 and the anode channel 120 along the longitudinal direction of the unit cell 100.

In other words, the passageway 130 is formed to allow a hole part 131 connecting the cathode channel 110 and the anode channel 120 and a barrier rib part 132 separating the cathode channel 110 and the anode channel 120 to be alternated with each other at a constant interval along the longitudinal direction of the unit cell 100.

As above, the passageway 130 discontinuously connects the cathode channel 110 and the anode channel 120 so that the area of the hole part 131 of the passageway 130 is reduced, making it possible to prevent the direct mixing of the cathode fluid and the anode fluid.

Referring again to FIG. 3, the cathode electrode 115 can be formed of at least one wall surface partitioning the cathode channel 110 and the anode electrode 125 also can be formed of at least one wall surface partitioning the anode channel 120.

More preferably, the cathode electrode 115 and the anode electrode 125 is formed at the wall surfaces of the cathode channel 110 and the anode channel 120 that face each other with the passageway 130 as the center.

In the present embodiment, it is illustrated that the cathode channel 110 and the anode channel 120 are partitioned by means of seven wall surfaces 111a to 111g and 121a to 121g, respectively, to have a substantially octagonal cross section shape, with the passageway 130 between the cathode channel and the anode channel to mutually connect them.

Therefore, the cathode electrode 115 and the anode electrode 125 can be formed of the vertical wall surfaces 111a and 121a of the cathode channel 110 and the anode channel 120 that face each other and outwardly sloped wall surfaces 111d, 111e, 121d, and 121e that are obliquely formed to be adjacent the vertical wall surfaces.

Of course, the cathode electrode 115 and the anode electrode 125 can be constituted by further comprising top and bottom wall surfaces 111b, 111c, 121b, and 121c or inwardly sloped wall surfaces 111f, 111g, 121f, 121g. Furthermore, the cathode electrode 115 and the anode electrode 125 can be constituted by only the top and bottom wall surfaces 111b, 111c, 121b, and 121c.

Also, each wall surface forming the cathode electrode 110 and the anode electrode 120 can be formed with preset surface roughness to be able to increase an electrode surface area. As one example, the wall surfaces forming each electrode can be formed in predetermined pattern shapes by embossing or engraving.

Preferably, the pattern shapes are formed to be able to derive the flow of the cathode fluid and the anode fluid to be constantly and extendedly formed along the longitudinal direction of the unit cell 110.

FIGS. 6 to 9 are views showing a shape of wall surfaces forming a cathode electrode and an anode electrode.

Figure 6:
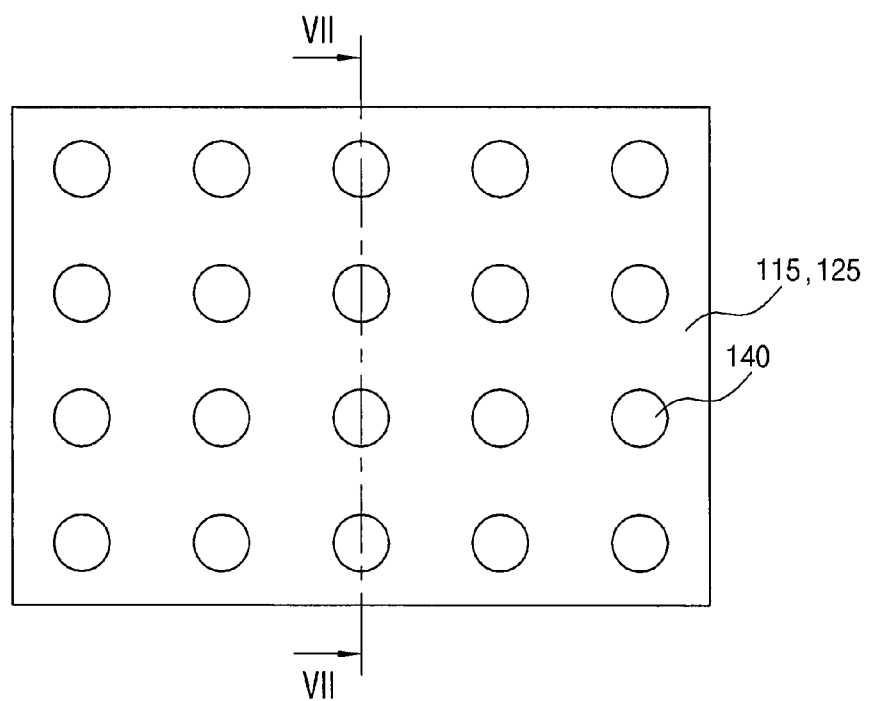
FIGS. 6 to 9 are views showing a shape of wall surfaces forming a cathode electrode and an anode electrode.
Figure 7:
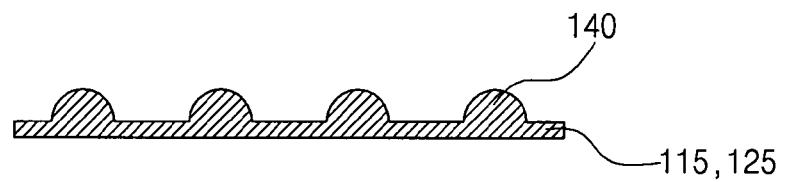

FIG. 6 is a view showing the cathode and anode electrode surface shapes and FIG. 7 is a cross-sectional view taken along line VII-VII of FIG. 6.

FIGS. 6 and 7 show that each wall surface forming the cathode electrode 115 and the anode electrode 125 is formed with a semispherical projection 140 that is projected by embossing.

However, in the present invention the projection 140 can be formed in more various shapes to take a form of a circular cross section shape, an oval cross section shape, or a polygonal cross section shape and can include the engraved projection in addition to the projection projected in the embossed shape.

Figure 8:
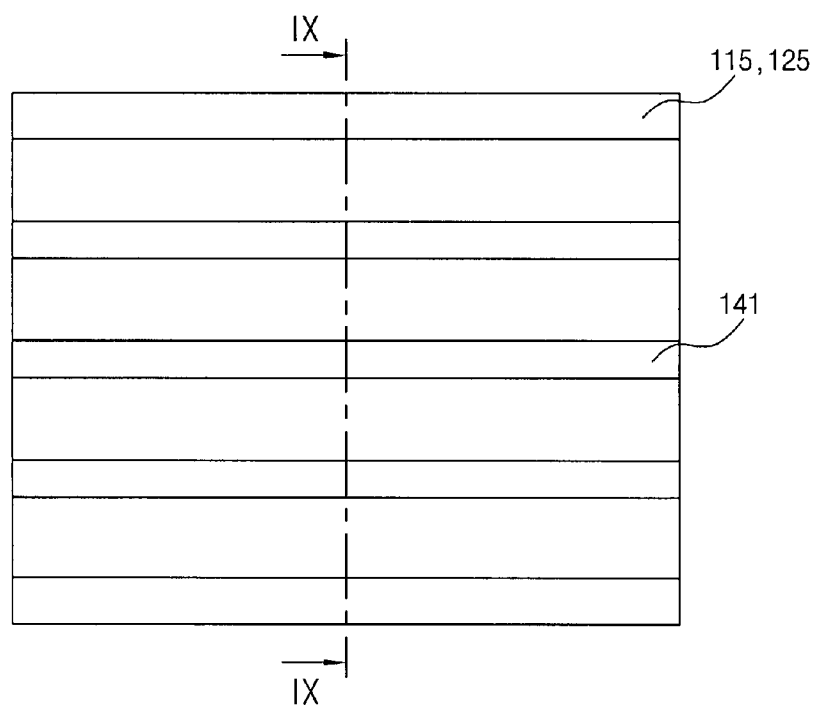
Figure 9:
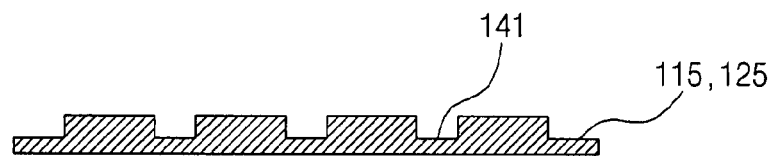

FIG. 8 is a view showing a modification example of the cathode and anode electrode surface shapes and FIG. 9 is a cross-sectional view taken along line IX-IX of FIG. 8.

Also, FIGS. 8 and 9 show that each wall surface forming the cathode electrode 115 and the anode electrode 125 is formed to allow an engraved groove 141 in a stripe shape along the longitudinal direction of the unit cell 100 to have a predetermined pattern.

As above, when the groove 141 in the stripe shape is formed along the longitudinal direction of the unit cell 100, it can derive the flow of the cathode fluid and the anode fluid as described above.

However, the groove of the present invention can be formed in more various shapes in addition to the stripe pattern shape and can include the embossed and engraved grooves.

In the membraneless fuel cell of the present embodiments as described above, the plurality of unit cells 100 forming the cell allows the cathode fluid and the anode fluid with a low Reynolds number flowing in the inside of the cathode channel 110 and the anode channel 120 to have an interface at the passageway 130 so that they are mixed by only diffusion, making it possible to separate the cathode fluid from the anode fluid without using the membrane.

Hereinafter, a membraneless fuel cell according to a second embodiment of the present invention will be described with reference to the accompanying drawings. However, the same or like parts as the first embodiment are indicated by the same reference numbers and the description thereof will be omitted.

Figure 10:
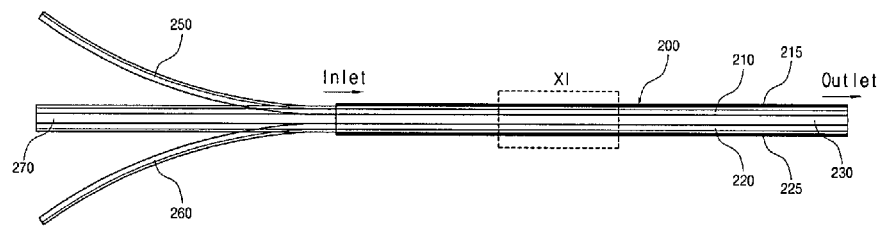
FIG. 10 is a plan view showing a unit cell of a membraneless fuel cell according to a second embodiment of the present invention.

FIG. 10 is a plan view showing a unit cell of a membraneless fuel cell according to a second embodiment of the present invention.

Referring to FIG. 10, respective unit cells 200 forming the membraneless fuel cell of the present embodiment comprise a cathode channel 210, an anode channel 220, and a proton conductive fluid channel 230 connecting the cathode channel 210 and the anode channel 220.

The inlet side ends of the respective unit cells 200 are connected to a cathode fluid supplying line 250 for supplying a cathode fluid to the cathode channel 210, an anode fluid supplying line 260 for supplying an anode fluid to the anode channel 220, and a proton conductive fluid supplying line 270 for supplying a proton conductive fluid to the inside of the proton conductive fluid channel 230, respectively.

In the present embodiment, it is illustrated that the respective unit cells 200 are arranged to be horizontal to each other. Therefore, it is illustrated that the cathode fluid supplying line 250, the anode fluid supplying line 260, and the proton conductive fluid supplying line 270 connected to the inlet side end of the unit cell 200 make an acute angle based on a central line and are connected in a 'fork' shape.

However, the present invention is not limited thereto, but can include any constitution wherein the respective unit cells 200 are vertically arranged or obliquely arranged.

Furthermore, the cathode fluid supplying line 250, the anode fluid supplying line 260, and the proton conductive supplying fluid line 270 connected to the inlet side end of the unit cell 200 can be connected in more various shapes, including the foregoing fork shape or a cross shape crossing at a right angle to each other.

Therefore, the cathode fluid, the anode fluid, and the proton conductive fluid supplied to each respective channel through the cathode fluid supplying line 250, the anode fluid supplying line 260, and the proton conductive fluid supplying line 270 is constituted to have a very low Reynolds number in the range of 100 to 0.01 as previously mentioned in the first embodiment.

In the present embodiment, it is illustrated that all of the cathode fluid, the anode fluid, and the proton conductive fluid is constituted to flow in the same direction in the inside of the respective channels.

However, the present invention is not limited thereto, but can include the constitution wherein at least one of the cathode fluid, the anode fluid, and the proton conductive fluid flows in an opposite direction to the others.

Figure 11:
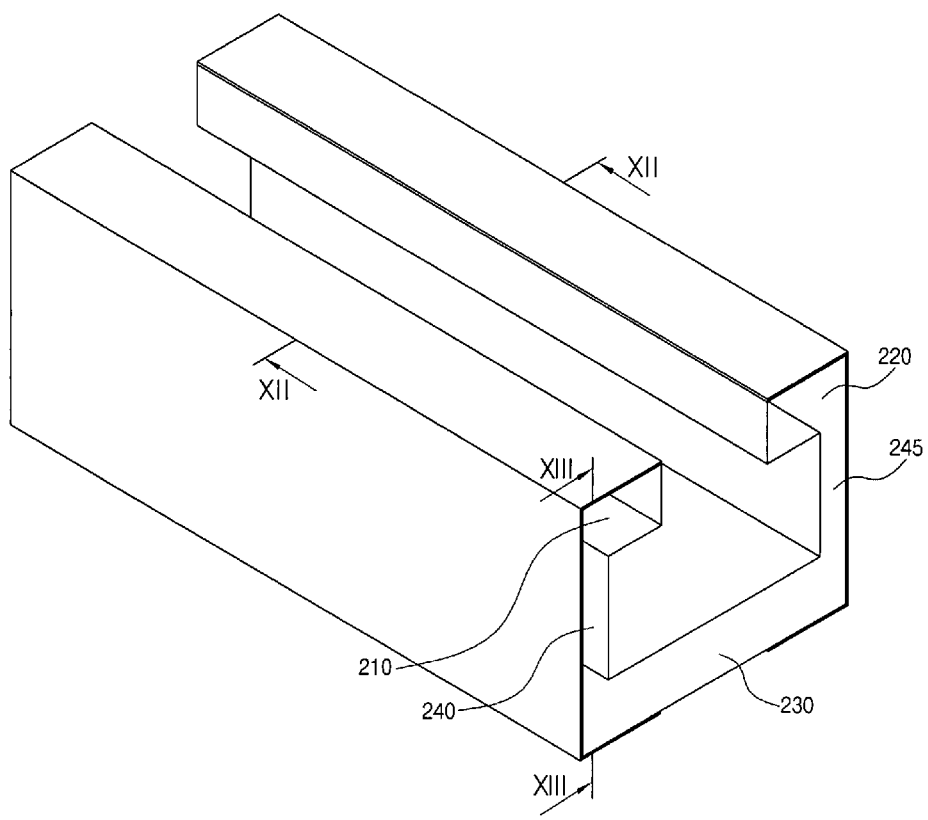
FIG. 11 is an enlarged cutaway perspective view showing part XI of FIG. 10.

FIG. 11 is an enlarged cutaway perspective view showing part XI of FIG. 10.

Referring to FIG. 11, it is illustrated that in the unit cell 200 of the present invention, the cathode channel 210 is connected to one side end of the proton conductive fluid channel 230 by means of a first passageway 240, the anode channel 220 is connected to the other side end of the proton conductive fluid channel 230 by means of a second passageway 245, and both the cathode channel 210 and the anode channel 220 are partitioned in parallel in a horizontal direction at the top side of the proton conductive fluid channel 230.

However, the present invention is not limited thereto, but can be constituted in any shape as long as in the unit cell 200, the cathode channel 210 and the anode channel 220 can be partitioned to be connected, with the proton conductive fluid channel 230 therebetween.

Therefore, the unit cell 200 of the present embodiment allows the cathode fluid and the proton conductive fluid to form an interface with each other through the first passageway 240 and the anode fluid and the proton conductive fluid to form an interface with each other through the second passageway 245. Consequently, protons move from the anode to the cathode using the proton conductive fluid as a medium.

Figure 12:
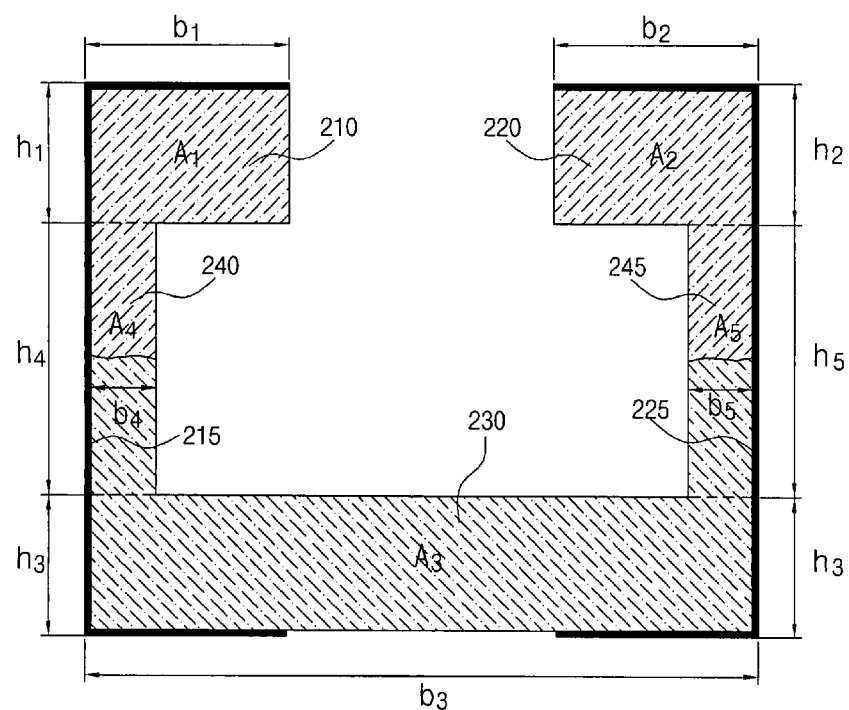
FIG. 12 is a cross-sectional view taken along line XII-XII of FIG. 11.

FIG. 12 is a cross-sectional view taken along line XII-XII of FIG. 11.

Referring to FIG. 12, in the unit cell 200 of the present embodiment the cathode channel 210, the anode channel 220, the proton conductive fluid channel 230, the first passageway 240, and the second passageway 245 are partitioned to have a quadrangular cross section shape.

However, the present invention is not limited thereto. Therefore, the cross section shapes of the cathode channel 210, the anode channel 220, and the proton conductive fluid channel 230 can be formed of any one of a circular shape, an oval shape and a polygonal shape.

Also, the cathode channel 210, the anode channel 220, and the proton conductive fluid channel 230 have the same cross section shape or one of them can be partitioned to have a different cross section shape.

In the present embodiment, it is illustrated that in the unit cell 200, the cathode channel 210 and the anode channel 220 have the same cross sectional area (A1=A2) and the cross sectional area of the proton conductive fluid channel 230 is formed to be larger than that of the cathode channel 210 and the anode channel 220 (A3>A1, A3>A2).

That is, the width of the proton conductive fluid channel 230 is formed to be greater (b3>b1, b3>b2) than that of the cathode channel 210 and the anode channel 220 so that the mixing length of the cathode fluid and the anode fluid is formed to be long, making it possible to prevent the direct mixing of the cathode fluid and the anode fluid.

However, the present invention encompasses all possible constitutions wherein the cathode channel 210, the anode channel 220, and the proton conductive fluid channel 230 have different cross sectional areas (A1≠A2≠A3) or at least two of the cathode channel 210, the anode channel 220, and the proton conductive fluid channel 230 have the same cross sectional area (A1=A2≠A3, A1≠A2=A3, A2≠A3=A1), and in particular, the cathode channel 210 and the anode channel 220 have the same cross sectional area (A1=A2).

Also, it is illustrated that the widths of the first passageway 240 and the second passageway 245 of the present embodiment are formed to be smaller (b4<b1 or b2, b5<b1 or b2) than that of the cathode channel 210 or the anode channel 220.

Here, the height h4 of the first passageway 240 between the cathode channel 210 and the proton conductive fluid channel 230 is formed to be considerably smaller as compared to the height h1 of the cathode channel 210 or the height h3 of the proton conductive fluid channel 230 (h4<h1, h4<h3).

At this time, the first passageway 240 can be formed in the shape of a hole (not shown) penetrating a wall surface (not shown) shared by the cathode channel 210 and the proton conductive fluid channel 230.

Accordingly, the cathode fluid and the proton conductive fluid form an interface with each other though the first passageway 240 and can be mixed by only diffusion.

Also, the height h5 of the second passageway 245 between the anode channel 220 and the proton conductive fluid channel 230 can be formed to be much smaller as compared to the height h2 of the anode channel 220 and the height h3 of the proton conductive fluid channel 230 (h5<h2, h5<h3). Furthermore, the second passageway 245 also can be formed penetrating through the side wall shared by the anode channel 220 and the proton conductive fluid channel 230.

Therefore, the anode fluid and the proton conductive fluid form an interface with each other through the first passageway 245 and can be mixed by only diffusion.

Figure 13:
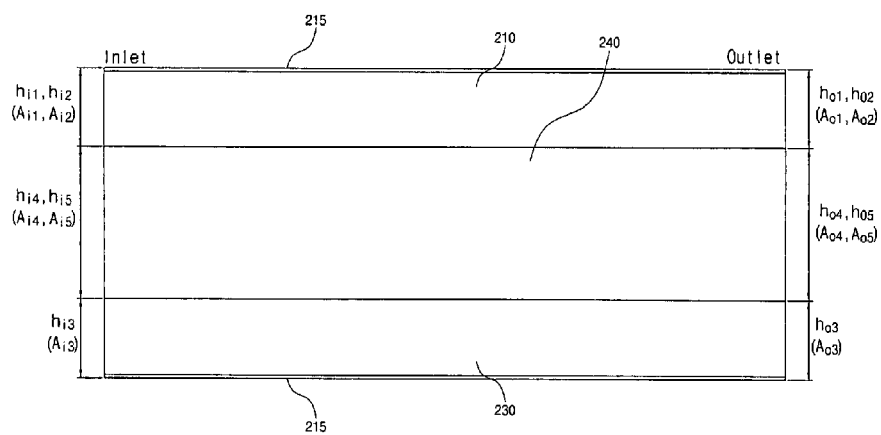
FIG. 13 is a sectional side view taken along line XIII-XIII of FIG. 11.

FIG. 13 is a sectional side view taken along line XIII-XIII of FIG. 11.

Referring to FIG. 13, in the present embodiment it is illustrated that the cathode channel 210(the anode channel 220), the proton conductive fluid channel 230, and the first passageway 240(the second passageway 245) are formed to have the same cross sectional area (Ai1=Ao1(Ai2=Ao2), Ai3=Ao3, Ai4=Ao4(Ai5=Ao5)) at inlet and outlet side ends along the longitudinal direction of the unit cell 200.

In the present embodiment, the anode channel 220 has the same cross section shape and the same cross sectional area (A1=A2) as the cathode channel 210, and the second passageway 245 also has the same cross section shape and the same cross sectional area (A4=A5) as the first passageway 240.

Therefore, the description of the anode channel 220 and the second passageway 245 may be replaced with the description of the cathode channel 210 and the first passageway 240.

However, the present invention is not limited thereto, but can include any constitution wherein the cathode channel 210, the anode channel 220, the proton conductive fluid channel 230, the first passageway 240, and the second passageway 245 have different cross sectional areas (Ai1≠Ao1 (Ai2≠Ao2), Ai3≠Ao3, Ai4≠Ao4(Ai5≠Ao5)) along the longitudinal direction of the unit cell 200 and wherein the cross sectional area is gradually reduced (Ai1>Ao1(Ai2>Ao2), Ai3>Ao3, Ai4>Ao4(Ai5>Ao5)) or gradually enlarged (Ai1<Ao1(Ai2<Ao2), Ai3<Ao3, Ai4<Ao4(Ai5<Ao5) as it proceeds from the inlet side end to the outlet side end of the unit cell 200.

Also, in the present invention it is illustrated that the first passageway 240 and the second passageway 245 continuously connect the cathode channel 210 and proton conductive fluid channel 230 and the anode channel 220 and proton conductive fluid channel 230 to each other along the longitudinal direction of the unit cell 200.

However, the present invention can include any constitution wherein the first passageway 240 and the second passageway 245 have a hole part and a wall surface part along the longitudinal direction of the unit cell as does the passageway shown in FIG. 5 and discontinuously connect the cathode channel 210 and the proton conductive fluid channel 230 as well as the anode channel 220 and the proton conductive fluid channel 230.

Referring again to FIG. 12, the cathode electrode 215 is formed of the cathode channel 210, the first passageway 240 adjacent the cathode channel 210, and a portion of the wall surfaces partitioning the proton conductive fluid channel 230.

And, the anode electrode 225 is formed of the anode channel 220, the second passageway 245 adjacent the anode channel 220, and a portion of the wall surfaces partitioning the proton conductive fluid channel 230.

Preferably, the cathode electrode 215 and the anode electrode 225 are formed of the wall surfaces facing each other, interposing the central part of the proton conductive fluid channel 230 therebetween, as described above.

Also, the cathode electrode 215 and the anode electrode 225 can be formed in a predetermined pattern by embossing or engraving, as previously shown in FIGS. 6 to 9.

The membraneless fuel cell of the present embodiment allows the cathode fluid and the proton conductive fluid to form an interface with each other through the first passageway 240 and to be mixed by diffusion.

The membraneless fuel cell of the present embodiment allows the anode fluid and the proton conductive fluid to form an interface with each other through the second passageway 245 and to be mixed by diffusion.

Consequently, protons move from the anode to the cathode using the proton conductive fluid as a medium.

Accordingly, the membraneless fuel cell of the present embodiment uses the proton conductive fluid along with the micro passageway as a buffer interval between the cathode fluid and the anode fluid so that the cathode fluid and the anode fluid can be separated from each other without using the membrane.

Although a few embodiments of the present invention have been shown and described, it would be appreciated by those skilled in the art that various changes may be made in this embodiment without departing from the principles and spirit of the invention, the scope of which is defined in the claims and their equivalents.

What is claimed is:

1. A membraneless micro fuel cell having a plurality of unit cells arranged in parallel each other, the unit cells comprising:
   a cathode channel which forms a pipeline of a square cross sectional shape along the longitudinal direction of the unit cell for cathode fluid to flow therein;
   an anode channel which is separated apart at one side of the cathode channel to be arranged in parallel to each other with the cathode channel, and forming a pipeline of a square cross sectional shape the same as the cathode channel along the longitudinal direction of the unit cell so that cathode fluid flows therein;
   a proton conductive fluid channel which is separated apart below the cathode channel and the anode channel to be arranged in parallel with the cathode channel and the anode channel, and forms a pipeline of a square cross sectional shape along the longitudinal direction of the unit cell so that proton conductive fluid flows therein;
   a first passageway which is vertically connected to one upper end portion of the proton conductive fluid channel and a lower end portion of the cathode channel which is opposed to the anode channel, so that the cathode fluid and the proton conductive fluid flow making an interface to be mixed by diffusion while forming a passageway of a square cross sectional shape along the longitudinal direction of the unit cell;
   a second passageway which is vertically connected to the other upper end portion of the proton conductive fluid channel and an a lower end portion of the anode channel which is opposed to the cathode channel, so that the anode fluid and the proton conductive fluid flow make an interface to be mixed by diffusion while forming a passageway of a square cross sectional shape the same as the first passageway along the longitudinal direction of the unit cell;
   a cathode electrode comprising side wall surfaces of the cathode channel, the first passageway, and the conductive fluid channel which are opposed to the anode channel based on the central part of the proton conductive fluid channel, and
   an anode electrode comprising side wall surfaces of the anode channel, the second passageway, and the conductive fluid channel which are opposed to the cathode channel based on the central part of the proton conductive fluid channel,
   wherein the cathode channel and the anode channel are vertically connected to the both end portions of the proton conductive fluid channel through the first passageway and the second passageway continuously along the longitudinal direction of the unit cell respectively, and
   the cathode channel and the first passageway, and the second passageway and the anode channel are connected through the conductive fluid channel to form a "U-shaped" cross section, and
   the widths of the first passageway and the second passageway are formed smaller than that of the cathode channel, the anode channel, or the proton conductive fluid channel, the heights of the first passageway and the second passageway are formed larger than that of the cathode channel, the anode channel, or the proton conductive fluid channel, and
   the cathode electrode and the anode electrode are formed with predetermined pattern shapes in the inside of the unit cell to have surface roughness,
   the pattern shapes are formed in parallel with each other along the longitudinal direction of the unit cell.

2. The membraneless micro fuel cell device of claim 1, wherein the cathode channel and the anode channel have the same cross sectional area.

3. The membraneless micro fuel cell device of claim 1, wherein the cross sectional areas of the cathode channel and the anode channel are constant along the longitudinal direction of the unit cell.

4. The membraneless micro fuel cell device of claim 1, wherein the cathode channel and the anode channel have different cross sectional areas.

5. The membraneless micro fuel cell device of claim 3, wherein the cathode channel and the anode channel have the same cross sectional area.

6. The membraneless micro fuel cell device of claim 1, wherein at least two of the cathode channel, the anode channel, and the proton conductive fluid channel have the same cross sectional area.

7. The membraneless micro fuel cell device of claim 1, wherein the cross sectional areas of the cathode channel, the anode channel, and the proton conductive fluid channel are constant along the longitudinal direction of the unit cell.

8. The membraneless micro fuel cell device of claim 1, wherein the cross sectional areas of the cathode channel and the anode channel are different along the longitudinal direction of the unit cell.

9. The membraneless micro fuel cell device of claim 8, wherein the cross sectional areas of the cathode channel and the anode channel are reduced as they proceed from the inlet side end to the outlet side end of the unit cell.

10. The membraneless micro fuel cell device of claim 8, wherein the cross sectional areas of the cathode channel and the anode channel are enlarged as they proceed from the inlet side end to the outlet side end of the unit cell.

11. The membraneless micro fuel cell device of claim 1, wherein the cross sectional areas of the cathode channel, the anode channel, and the proton conductive fluid channel are different along the longitudinal direction of the unit cell.

12. The membraneless micro fuel cell device of claim 11, wherein the cross sectional areas of the cathode channel, the anode channel, and the proton conductive fluid channel are reduced as they proceed from the inlet side end to the outlet side end of the unit cell.

13. The membraneless micro fuel cell device of claim 11, wherein the cross sectional areas of the cathode channel, the anode channel, and the proton conductive fluid channel are enlarged as they proceed from the inlet side end to the outlet side end of the unit cell.

14. The membraneless micro fuel cell device of claim 1, wherein the cross sectional area of the proton conductive fluid channel is formed to be constant along the longitudinal direction of the unit cell.

15. The membraneless micro fuel cell device of claim 1, wherein the cross sectional area of the proton conductive fluid channel is formed to be different along the longitudinal direction of the unit cell.

16. The membraneless micro fuel cell device of claim 15, wherein the cross sectional area of the proton conductive fluid channel is reduced as it proceeds from the inlet side end to the outlet side end of the unit cell.

17. The membraneless micro fuel cell device of claim 15, wherein the cross sectional area of the proton conductive fluid channel is enlarged as it proceeds from the inlet side end to the outlet side end of the unit cell.

18. The membraneless micro fuel cell device of claim 1, wherein the cathode channel and the anode channel have any one cross section shape of a circular shape, an oval shape, and a polygonal shape.

19. The membraneless micro fuel cell device of claim 18, wherein the cathode channel and the anode channel have the same cross section shape.

20. The membraneless micro fuel cell device of claim 18, wherein the cathode channel and the anode channel have different cross section shapes.

21. The membraneless micro fuel cell device of claim 1, wherein the cathode channel, the anode channel, and the proton conductive fluid channel have different cross section shapes.

22. The membraneless micro fuel cell device of claim 1, wherein the cathode fluid and the anode fluid flow with a Reynolds number in the range of 100 to 0.01.

23. The membraneless micro fuel cell device of claim 22, wherein the cathode fluid and the anode fluid flow in the same direction.

24. The membraneless micro fuel cell device of claim 22, wherein the cathode fluid and the anode fluid flow in an opposite direction to each other.

25. The membraneless micro fuel cell device of claim 1, wherein the cathode fluid, the anode fluid, and the proton conductive fluid flow with a Reynolds number in the range of 100 to 0.01.

26. The membraneless micro fuel cell device of claim 25, wherein all of the cathode fluid, the anode fluid, and the proton conductive fluid flow in the same direction.

27. The membraneless micro fuel cell device of claim 25, wherein at least one of the cathode fluid, the anode fluid, and the proton conductive fluid flow in an opposite direction to each other.

28. The membraneless micro fuel cell device of claim 27, wherein the cathode fluid and the anode fluid flow in an opposite direction to each other.

29. The membraneless micro fuel cell device of claim 1, wherein the unit cells are arranged in parallel with each other in a horizontal direction.

30. The membraneless micro fuel cell device claim 29, wherein the height of the first passageway between the cathode channel and the proton conductive fluid channel is formed to be smaller than that of the cathode channel or the proton conductive fluid channel.

31. The membraneless micro fuel cell device of claim 30, wherein the first passageway is formed of a hole penetrating through a side wall surface shared by the cathode channel and the proton conductive fluid channel.

32. The membraneless micro fuel cell device of claim 29, wherein the height of the second passageway between the anode channel and the proton conductive fluid channel is formed to be smaller than that of the anode channel or the proton conductive fluid channel.

33. The membraneless micro fuel cell device of claim 32, wherein the second passageway is formed of a hole penetrating through a side wall surface shared by the anode channel and the proton conductive fluid channel.

34. The membraneless micro fuel cell device of claim 29, wherein the height of the second passageway between the anode channel and the proton conductive fluid channel is formed to be larger than that of the anode channel or the proton conductive fluid channel.

35. The membraneless micro fuel cell device of claim 29, wherein the unit cells are vertically or obliquely arranged, and arranged in parallel with each other.

36. The membraneless micro fuel cell device of claim 1, wherein the width of the proton conductive fluid channel between the cathode channel and the anode channel is formed to be larger than that of the cathode channel or the anode channel.

37. The membraneless micro fuel cell device of claim 1, wherein the unit cells are vertically or obliquely arranged, and arranged in parallel with each other.

38. The membraneless micro fuel cell device of claim 1, wherein the cross sectional areas of the first passageway and the second passageway are constant along the longitudinal direction of the unit cell.

39. The membraneless micro fuel cell device of claim 1, wherein the cross sectional areas of the first passageway and the second passageway are different along the longitudinal direction of the unit cell.

40. The membraneless micro fuel cell device of claim 39, wherein the cross sectional areas of the first passageway and the second passageway are reduced as they proceed from the inlet side end to the outlet side end of the unit cell.

41. The membraneless micro fuel cell device of claim 39, wherein the cross sectional areas of the first passageway and the second passageway are enlarged as they proceed from the inlet side end to the outlet side end of the unit cell.

42. The membraneless micro fuel cell device of claim 1, wherein the proton conductive fluid channel continuously connects the cathode channel and the anode channel along the longitudinal direction of the unit cell.

43. The membraneless micro fuel cell device of claim 1, wherein the proton conductive fluid channel discontinuously connects the cathode channel and the anode channel along the longitudinal direction of the unit cell.

44. The membraneless micro fuel cell device of claim 1, wherein the first passageway and the second passageway discontinuously connect each of the cathode channel and the anode channel to the proton fluid channel along the longitudinal direction of the unit cell.

45. The membraneless micro fuel cell device of claim 1, wherein the cathode channel and the anode channel are arranged up and down, with the proton conductive fluid channel therebetween.

46. The membraneless micro fuel cell device of claim 1, wherein the height of the proton conductive fluid channel is formed to be smaller than that of the cathode channel or the anode channel.

47. The membraneless micro fuel cell device of claim 1, wherein the width of the proton conductive fluid channel between the cathode channel and the anode channel is formed to be smaller than that of the cathode channel or the anode channel.

48. The membraneless micro fuel cell device of claim 47, wherein the proton conductive fluid channel is formed of a hole penetrating through a side wall surface shared by the cathode channel and the anode channel.

* * * * *